(12) United States Patent
Davis

(10) Patent No.: US 7,740,077 B2
(45) Date of Patent: Jun. 22, 2010

(54) DOWNHOLE OILFIELD TUBULARS

(75) Inventor: Robert H. Davis, Katy, TX (US)

(73) Assignee: Wagon Trail Ventures, Inc., Houston, TX (US)

( * ) Notice: Subject to any disclaimer, the term of this patent is extended or adjusted under 35 U.S.C. 154(b) by 0 days.

(21) Appl. No.: 11/343,690

(22) Filed: Jan. 31, 2006

(65) Prior Publication Data

US 2006/0124308 A1    Jun. 15, 2006

Related U.S. Application Data

(63) Continuation-in-part of application No. 10/366,936, filed on Feb. 14, 2003, now abandoned.

(60) Provisional application No. 60/367,132, filed on May 16, 2002.

(51) Int. Cl.
*E21B 43/00* (2006.01)

(52) U.S. Cl. .................. 166/381; 166/242.1; 138/140

(58) Field of Classification Search .............. 166/242.1, 166/68, 381; 138/140, 149
See application file for complete search history.

(56) References Cited

U.S. PATENT DOCUMENTS

| | | | | |
|---|---|---|---|---|
| 3,429,954 A | * | 2/1969 | Atkins et al. | 264/456 |
| 4,171,560 A | * | 10/1979 | Garrett | 29/455.1 |
| RE31,016 E | | 8/1982 | Oster | |
| 4,606,953 A | * | 8/1986 | Suzuki et al. | 138/143 |
| 4,852,655 A | * | 8/1989 | Guy | 166/380 |
| 4,892,442 A | | 1/1990 | Shoffner | |
| 5,048,441 A | | 9/1991 | Quigley et al. | |
| 5,069,284 A | | 12/1991 | Gray | |
| 5,135,053 A | * | 8/1992 | Lowther | 166/300 |
| 5,188,872 A | | 2/1993 | Quigley et al. | |
| 5,351,752 A | * | 10/1994 | Wood et al. | 166/68 |
| RE35,081 E | | 11/1995 | Quigley | |
| 5,472,754 A | | 12/1995 | Doucher et al. | |
| 5,511,619 A | * | 4/1996 | Jackson | 166/369 |
| 5,590,716 A | * | 1/1997 | Mansfield | 166/302 |
| 5,622,210 A | * | 4/1997 | Crisman et al. | 138/104 |
| 5,755,266 A | * | 5/1998 | Aanonsen et al. | 138/174 |
| 5,921,285 A | | 7/1999 | Quigley et al. | |
| 5,933,945 A | * | 8/1999 | Thomeer et al. | 29/825 |
| RE36,362 E | | 11/1999 | Jaclson | |

(Continued)

OTHER PUBLICATIONS

PCT/US03/04493 International Search Report dated Aug. 22, 2003, 3p.

*Primary Examiner*—Shane Bomar
(74) *Attorney, Agent, or Firm*—Douglas H. Elliott

(57) ABSTRACT

The installation and use of abrasion and corrosion resistant polyolefin and polyolefin blend liners in the production or injection string of a well is shown. The lining is employed for the principal purpose of reducing wear or corrosion on the tubing string or wear on the associated production equipment. In a preferred embodiment of the invention, the polymer liner is characterized by polypropylene material, which is abrasion resistant and which has a coefficient of friction that is lower that the coefficient of friction of metal tubing. Also, disclosed herein are tubular goods and tubular good liners which decrease or eliminate friction and mechanical wear and decrease or eliminate chemical corrosion to the walls of the tubular good. The liners may include a diffusion barrier, an adhesive, and a friction and wear resistant layer.

11 Claims, 3 Drawing Sheets

U.S. PATENT DOCUMENTS

| | | |
|---|---|---|
| 6,004,639 A | 12/1999 | Quigley et al. |
| 6,016,845 A | 1/2000 | Quigley et al. |
| 6,062,996 A | 5/2000 | Quigley et al. |
| 6,079,959 A | 6/2000 | Kingsford et al. |
| 6,148,866 A | 11/2000 | Quigley et al. |
| 6,170,535 B1 | 1/2001 | Sadr et al. |
| 6,177,516 B1 | 1/2001 | Hudak |
| 6,286,558 B1 * | 9/2001 | Quigley et al. .............. 138/125 |
| 6,312,637 B1 | 11/2001 | Evans et al. |
| 6,357,485 B2 | 3/2002 | Quigley et al. |
| 6,361,299 B1 | 3/2002 | Quigley et al. |
| 6,422,269 B1 | 7/2002 | Johansson et al. |
| 6,527,015 B2 * | 3/2003 | Lively ........................ 138/149 |
| 6,585,049 B2 * | 7/2003 | Leniek, Sr. .................. 166/369 |
| 6,604,550 B2 | 8/2003 | Quigley et al. |
| 6,663,453 B2 | 12/2003 | Quigley et al. |
| 6,684,910 B2 | 2/2004 | Stoffelsma et al. |
| 6,706,348 B2 | 3/2004 | Quigley et al. |
| 6,764,365 B2 | 7/2004 | Quigley et al. |
| 6,857,452 B2 | 2/2005 | Quigley et al. |
| 6,978,804 B2 | 12/2005 | Quigley et al. |
| 7,029,356 B2 | 4/2006 | Quigley et al. |
| 7,134,495 B2 * | 11/2006 | Vloedman et al. .......... 166/277 |
| 7,152,632 B2 | 12/2006 | Quigley et al. |
| 7,234,410 B2 | 6/2007 | Quigley et al. |
| 2001/0029989 A1 | 10/2001 | Paz |
| 2002/0066491 A1 * | 6/2002 | Lively ........................ 138/149 |
| 2003/0232207 A1 * | 12/2003 | Thullen et al. ........... 428/476.3 |
| 2004/0118468 A1 * | 6/2004 | Mestemacher .............. 138/137 |

* cited by examiner

DOWNHOLE OILFIELD TUBULARS

CROSS-REFERENCE TO RELATED APPLICATIONS

This application is a continuation-in-part of U.S. patent application Ser. No. 10/366,936, filed Feb. 14, 2003 now abandoned, which claims benefit of U.S. provisional patent application Ser. No. 60/367,132, filed May 16, 2002. Each of the aforementioned related patent applications is herein incorporated by reference.

BACKGROUND OF THE INVENTION

1. Field of the Invention

The present invention pertains in general to oil field production and fluid handling equipment and in particular to the use of certain polymer liners in downhole production, disposal and injection tubulars.

2. Description of Related Art

Downhole tubulars are commonly used in conventional methods to produce oil from underground reservoirs including free flowing, reciprocating rod pumped, plunger lifted, gas lifted, submersible pumped, progressive cavity pumped, and hydraulically lifted methods. Other common uses include source, injection or disposal tubulars used to transport corrosive gases and fluids such as water and/or carbon dioxide ($CO_2$) either for disposal or in secondary recovery operations.

Historically, wells produced using conventional reciprocating rod pumping units, rotating progressive cavity pumps, or plunger lift units in particular have evidenced problems with tubing and/or production equipment due to abrasion of the moving parts of the artificial lift devices (for example rods, rod couplings and plungers) on the tubing walls. These failures may be accelerated by the presence of corrosive elements and/or by the deviation of the well bore. The production tubing joints are protected with various corrosion resistant organic coatings that have been used in these applications to protect these areas from corrosive attack for many decades. A polyethylene liner greatly reduces these failures.

The lining of pipe and tubing with polymer liners for corrosion control and abrasion resistance has been practiced heretofore. For example, polyolefin liners have been installed in flow lines and fittings for the transportation of corrosive fluids in the chemical process industry for some time. The use of thermoplastic polymer liner materials such as polyethylene and polyvinylchloride is common in oil country tubular goods utilized primarily for water injection strings and disposal strings. Polyethylene has been used in downhole tubulars as shown in U.S. Pat. Re. 36,362, issued Nov. 2, 1999.

One objective of this invention is to utilize certain polyolefin liners for the purpose of eliminating metal to metal contact between the rods, rod couplings, or plunger and the production string in artificially lifted production wells, thereby reducing the frequency of failures to all of the mentioned components due to corrosion, friction, wear or a combination thereof. An additional benefit of the reduction in friction in these wells is an increased operating efficiency by reducing the power required to operate the wells and increasing the fall rates of the plungers.

Still another object of this invention is to provide protection of OCTG by providing an opportunity to reduce the operating costs by reducing the chemical treatment costs of the well fluids.

Yet another object of this invention is to increase the pressure rating of the tubing because the hoop strength is now a sum of that of the liner in addition to the pipe it is installed in. Unbreached, the liner will control internal corrosion of the tubing and allow for the use of lower than usual quality OCTG because no internal corrosion allowance is required.

A common problem with prior art plastic coating and liner materials is mechanical damage from installation practices or intrusive wellbore operations performed after the tubulars are placed in service. This is commonly referred to as "wireline damage" in the industry. Still another object of the present polyolefin liner system invention is to reduce the frequency of this type of damage.

As noted above, tubular goods, such as oil country tubular goods ("OCTG's") (e.g., well casing, tubing, drillpipe, drill collars, and line pipe) and flowline tubular goods, are often used for transportation of gases, liquids, and mechanical equipment, including various applications related to extraction of petroleum and natural gas from underground reservoirs, transportation of petroleum, natural gas, and other materials, such as solution mining and slurry transport lines in the mining industry. OCTG's may be used to transport the product from the underground reservoir, and also to house mechanical equipment (e.g., artificial lift devices, rod couplings, plungers, reciprocating rod pumping units, rotating progressive cavity pumps, and plunger lift units), electrical equipment (e.g., well monitoring equipment), and/or transport gases or liquids for disposal operations or secondary removal operations. These gases and liquids may contain corrosive materials such as, by way of example only, salt water, dissolved oxygen, $CO_2$, or $H_2S$. In addition, flowline tubular goods may be used to transport petroleum, petroleum products, natural gas, or other gases or liquids from one point to another. The gases and liquids which flow within flowlines may, comprise corrosive and/or abrasive components. In addition, flowline tubular goods may also occasionally require the use of mechanical equipment, such as pigs, to clean or service the tubular good.

With respect to moving mechanical equipment and abrasive fluids, such as reciprocating or rotating rods or pumps or drilling or mining slurries (e.g., drilling mud), friction and abrasion may cause wear, fatigue, and even failure of the pipe and/or the equipment. In addition, this wear, fatigue, or failure may be accelerated due to the presence of corrosive or abrasive materials, such as, for example $CO_2$, or by deviations in the direction of the well bore. As noted above, one method of combatting this wear in oil well production equipment is disclosed in U.S. Pat. No. RE36,362 to Jackson, incorporated herein by reference.

In addition to the possible acceleration of mechanical wear, fatigue, and failure, the presence of corrosive material, in and of itself, may cause chemical damage to the OCTG's and flowline tubular goods. By way of example only, the presence of $CO_2$, when contacted with metal or other materials may cause corrosion, dusting, rusting, or pitting, which may lead to failure of the material. In addition, the presence of microbiological active agents, such as bacteria, may produce chemicals which influence or accelerate corrosion.

It would therefore be desirable to create tubular goods which decrease or eliminate the mechanical and/or chemical wear, fatigue, or failure caused by the conditions surrounding the extraction of materials such as petroleum or natural gas and transportation of materials, thereby potentially increasing the life and productivity of the tubular good.

SUMMARY OF INVENTIONS

At least one specific embodiment of a downhole oilfield tubular apparatus disclosed herein comprises (includes): a structure that is configured to be vertically disposed in a well and has a tubular borehole with an inner surface; and a liner disposed inside the tubular borehole, wherein the liner comprises one or more layers, at least one of the layers including polypropylene.

Examples of a downhole oilfield tubular apparatus include: (a) a beam pumping system; (b) a progressive cavity pumping system; (c) a downhole reservoir pressure well that includes a plurality of tubing sections; (d) a plunger lifted system; (e) a submersible pump; (f) a gas lifted system having a downhole mandrel; (g) a string of injection well tubing in an enhanced oil recovery well; or (h) a string of injection well tubing in a disposal well.

In one or more of the downhole oilfield tubular apparatus the polypropylene is a polypropylene homopolymer.

In one or more of the downhole oilfield tubular apparatus the polypropylene consists essentially of a polypropylene homopolymer.

In one or more of the downhole oilfield tubular apparatus the liner has a single layer.

In one or more of the downhole oilfield tubular apparatus the liner has a three or more layers and at least one of the layers includes polypropylene.

In one or more of the downhole oilfield tubular apparatus the liner has three or more layers, including: a first outer layer, a second outer layer and an inner layer that is disposed between the first outer layer and the second outer layer, wherein the first outer layer or the second outer layer, or both, include polypropylene, and wherein the inner layer contains no polypropylene.

In one or more of the downhole oilfield tubular apparatus the liner has three or more layers, including: a first outer layer, a second outer layer and an inner layer that is disposed between the first outer layer and the second outer layer, wherein the first outer layer or the second outer layer, or both, include polypropylene, wherein the inner layer contains no polypropylene, wherein the first outer layer has an outer surface that is in adjacent contact with the inner surface of the borehole and wherein the second outer layer has an outer surface that is in adjacent contact with the inner layer.

In one or more of the downhole oilfield tubular apparatus the liner includes up to 20% of an additive.

In one or more of the downhole oilfield tubular apparatus the liner has a wall thickness between about 2 and 10 millimeters.

In one or more of the downhole oilfield tubular apparatus the liner has a diameter between about 20 and 700 millimeters.

In one or more of the downhole oilfield tubular apparatus the apparatus includes a rod pumping system and a plurality of sucker rods disposed within a string of tubing that comprises a plurality of tubing sections each having a tubular borehole and an inside diameter; and a downhole pump operably connected to the sucker rods; wherein the one or more tubing sections has the liner comprising polypropylene disposed within the tubular borehole of the one or more tubing sections.

One or more of the downhole oilfield tubular apparatus that is or includes a progressive cavity pumping system includes a plurality of sucker rods disposed within a string of tubing that comprises one or more tubing sections each having a tubular borehole and an inside diameter; and a downhole pump operably connected to the sucker rods; wherein the one or more tubing sections has the liner comprising polypropylene disposed within the tubular borehole of the one or more tubing sections.

One or more of the downhole oilfield tubular apparatus that is or includes a downhole reservoir pressure well capable of being openly produced to facilitate lifting fluids, solids or gases to the surface includes a string of tubing that comprises one or more tubing sections each having a tubular borehole and an inside diameter; wherein the one or more tubing sections has the liner comprising polypropylene disposed within the tubular borehole of the one or more tubing sections.

One or more of the downhole oilfield tubular apparatus that is or includes a plunger lifted system that includes a cylindrical object capable of raising fluids to the surface of the ground includes a receiver for the plunger cylinder that includes a string of tubing comprising one or more tubing sections each having a tubular borehole and an inside diameter wherein the one or more tubing sections has the liner that includes polypropylene disposed within the tubular borehole of the one or more tubing sections.

One or more of the downhole oilfield tubular apparatus The downhole oilfield tubular apparatus includes a submersible pump that includes a downhole impeller driven pump and a string of tubing comprising one or more tubing sections each having a tubular borehole and an inside diameter wherein the one or more tubing sections has the liner that includes polypropylene disposed within the bore of the tubing section.

In one or more of the downhole oilfield tubular apparatus the submersible pump is a jet pump.

In one or more of the downhole oilfield tubular apparatus the submersible pump is a hydraulic pump.

In one or more of the downhole oilfield tubular apparatus the submersible pump is an electric submersible pump.

One or more of the downhole oilfield tubular apparatus includes a gas lifted system that includes a set of downhole mandrels deployed within a tubing string for injecting gas into a produced fluid and a string of tubing comprising one or more tubing sections each having a tubular borehole and an inside diameter wherein the one or more tubing sections has the liner that includes polypropylene disposed within the tubular borehole of the one or more tubing sections.

Also disclosed is a method of using one or more of the downhole oilfield tubular apparatus disclosed herein that includes injecting fluids or gases into the apparatus for enhanced recovery of natural resources in a downhole formation.

Also disclosed is a method of using one or more of the downhole oilfield tubular apparatus disclosed herein wherein the injected fluids or gases includes water.

Also disclosed is a method of using one or more of the downhole oilfield tubular apparatus disclosed herein wherein the injected fluids or gases includes carbon dioxide.

Also disclosed is a method of using one or more of the downhole oilfield tubular apparatus disclosed herein that includes injecting fluids or gases into the apparatus for disposing of fluids or gases.

Also disclosed is a method of using one or more of the downhole oilfield tubular apparatus disclosed herein that includes removing hydrocarbons from a well by passing the hydrocarbons through the apparatus such that the hydrocarbons make contact with the liner that comprises polypropylene.

Also disclosed is a method of using one or more of the downhole oilfield tubular apparatus disclosed herein that includes injecting well fluids through the apparatus and into a well to alter the underground formation around the well.

At least one specific embodiment of a downhole oilfield tubular apparatus disclosed herein comprises (includes): a structure that is configured to be vertically disposed in a well and has a tubular borehole with an inner surface; and a liner disposed inside the tubular borehole, wherein the liner comprises three or more layers and the downhole oilfield tubular apparatus is selected from the group consisting of: (a) a rod pumping system; (b) a progressive cavity pumping system; (c) a downhole reservoir pressure well that includes a plurality of tubing sections; (d) a plunger lifted system; (e) a submersible pump; (f) a gas lifted system that includes a downhole mandrel; (g) a string of injection well tubing in an enhanced oil recovery well; and (h) a string of injection well tubing in a disposal well.

DETAILED DESCRIPTION

In one or more aspects, the present invention relates to the use of certain polyolefin lined tubing strings to reduce the frictional forces and corrosive interactions between artificial lift components and/or transported fluids and the OCTG string in downhole wells.

To better understand the present invention, a brief description of the various applications and materials are listed below, it being understood that the word "invention" can (but does not necessarily) refer to one or more specific embodiments of the invention, or in some cases one or more "claims" found at the conclusion of the application or issued patent.

Figure 1:
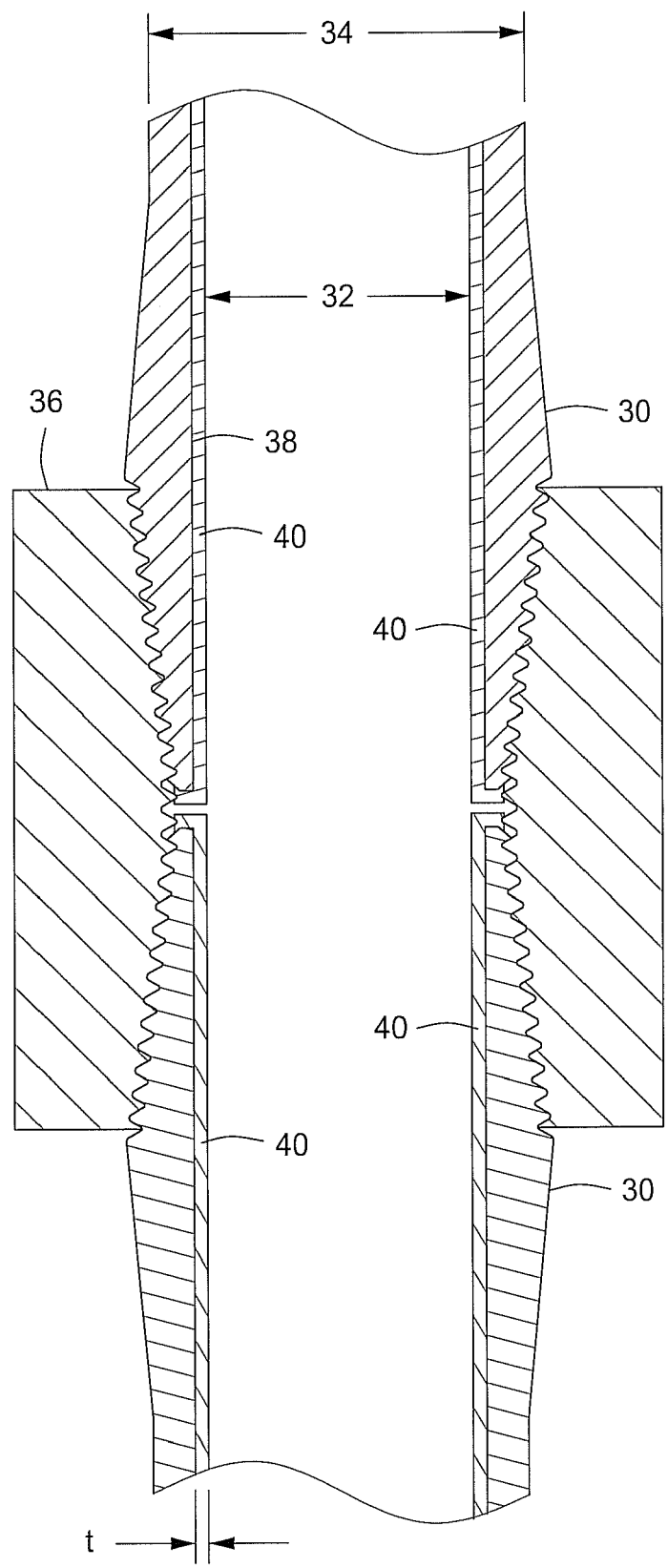
FIG. 1, a schematic drawing of a tubular good in accordance with embodiments of the present invention, is a sectional view of coupled, polymer lined tubing joints.

As disclosed below and elsewhere herein, a downhole oilfield tubular is an apparatus that includes a "tubular borehole" (also referred to as a "bore") which typically corresponds to the inside surface of a conduit that is part of the apparatus. In some cases the tubular apparatus includes two or more coupled, tubing joints as shown in FIG. 1, e.g., a tubing string.

The apparatus includes a polymer liner, which is constructed of a durable material such as polypropylene. The preferred polymer lining material is a polypropylene based polyolefin. A liner made from polypropylene homopolymer is preferred. Another example of a polypropylene useful in the liner is an impact-grade polypropylene copolymer filled with up to 20% of an additive designed to control gas permeability. The wall thickness of the liners is typically between about 2 and 10 millimeters. The diameter of the liners is typically between about 20 and 700 millimeters.

As noted above, a propylene homopolymer is a favored liner material. In the context of downhole oilfield tubulars, a surprising result has been discovered when using a liner made of a polypropylene homopolymer, representing a decided improvement over a liner made of another type of polyolefin such as polyethylene. At least one surprising result is an improvement in resistance to degradation by aromatic compounds, which compounds are are often part of the hydrocarbons that make contact with the liner during operation of the apparatus. Such resistance to degradation is particularly enhanced at higher temperatures.

One or more specific embodiments includes one or more liners that either include polypropylene or consist entirely of polypropylene, or consist essentially of polypropylene, where the polypropylene can be, but is not limited to: nucleated polypropylene; any polyolefins containing nanocomposites or other additives to control diffusion rates of compounds through the liner wall; impact copolymer grade polypropylene; homopolymer grade polypropylene; heterophasic copolymers; fractional melt grade polypropylene; other thermoplastics coextruded with polypropylene; reactor made thermoplastic polyolefins; metallocene catalyzed polypropylenes; random copolymer polypropylenes; atactic polypropylene; isotactic polypropylene; syndiotactic polypropylene; blends, alloys, filled or reinforced polypropylene or polyethylene containing polyolefins.

Figure 3:
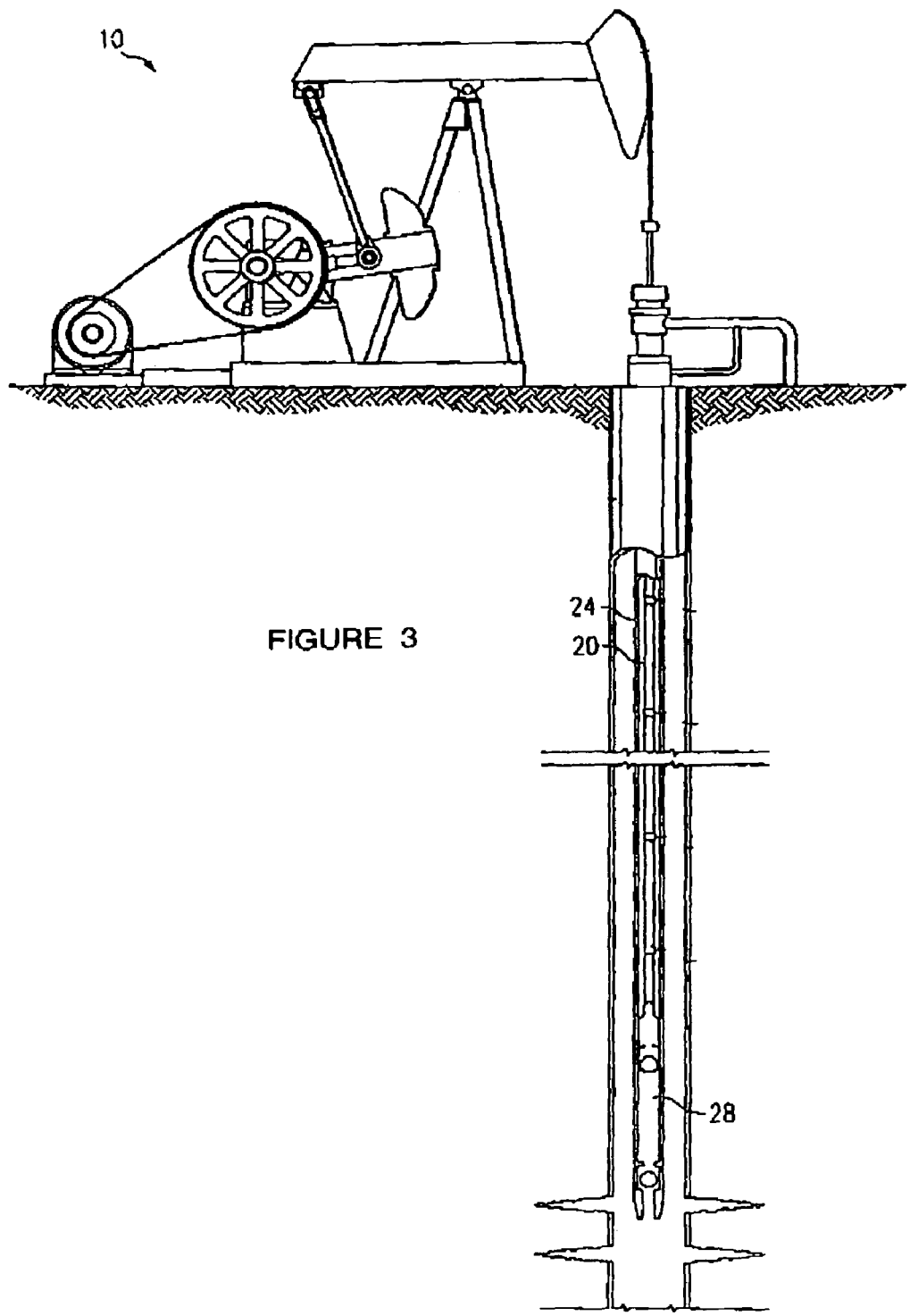

The liner can be used with the following methods of producing or disposing or injecting well fluids from or in a well:

For a rod pumping system 10 (see FIG. 3) commonly referred to as a beam pumping well, using a plurality of sucker rods 20 (see FIG. 3) disposed within a string of tubing 24 which extends into said well, said string of tubing comprising a plurality of tubing sections each having a bore and an inside diameter; a down hole pump 28 operably connected to said sucker rods 20; and means for reciprocating said sucker rods wherein the improved method comprises using tubing sections having polyolefin liners disposed within said bore of said tubing sections to eliminate contact between said sucker rods and said tubing string when said sucker rods are being reciprocated.

For a rotating rod pumping system 10 (see FIG. 3) commonly referred to as a progressive cavity pumping system, using a plurality of sucker rods 20 (see FIG. 3) disposed within a string of tubing 24 which extends into said well, said string of tubing comprising a plurality of tubing sections each having a bore and an inside diameter; a down hole pump 28 operably connected to said sucker rods 20; and means for rotating said sucker rods wherein the improved method comprises using tubing sections having polyolefin liners disposed within said bore of said tubing sections to eliminate contact between said sucker rods and said tubing string when said sucker rods are being rotated.

For a downhole reservoir pressure well being openly produced to facilitate lifting fluids, solids or gases to the surface, using a string of tubing comprising a plurality of tubing sections each having a bore and an inside diameter wherein the improved method comprises using tubing sections having polyolefin liners disposed within said bore of said tubing sections to eliminate contact between said produced fluids, solids and gases and said tubing string to eliminate corrosive or erosive interactions between them.

For a plunger lifted system, using a cylindrical object used to raise the fluids to the surface, a receiver for the plunger cylinder, and a string of tubing comprising of a plurality of tubing sections each having a bore and an inside diameter wherein the improved method comprises using tubing sections having polyolefin liners disposed within said bore of said tubing sections to eliminate contact between said produced fluids and the cylinder and said tubing string to eliminate corrosive or erosive interactions between them when the plunger is deployed.

For a submersible pump commonly referred to as a jet pump, hydraulic pump or electric submersible pump, using a downhole impeller driven pump and a string of tubing comprising a plurality of tubing sections each having a bore and an inside diameter wherein the improved method comprises using tubing sections having polyolefin liners disposed within said bore of said tubing sections to eliminate contact between said produced fluids, solids and gasses and said tubing string to eliminate corrosive or erosive interactions between them.

For gas lifted methods, using a set of downhole mandrels deployed within the tubing string to inject gas into the produced fluid and a string of tubing comprising a plurality of tubing sections each having a bore and an inside diameter wherein the improved method comprises using tubing sections having polyolefin liners disposed within said bore of said tubing sections to eliminate contact between said produced fluids, solids and gases and said tubing string to eliminate corrosive or erosive interactions between them.

To inject fluids or gases for enhanced recovery of natural resources in downhole formations or for the purpose of disposing of the transported fluids or gases, using a string of tubing comprising a plurality of tubing sections each having a bore and an inside diameter wherein the improved method comprises using tubing sections having polyolefin liners disposed within said bore of said tubing sections to eliminate contact between said injected fluids, solids and gases and said tubing string to eliminate corrosive or erosive interactions between them. The injected fluids or gases may include carbon dioxide ($CO_2$) or aqueous (water) materials.

For a string of tubing comprising of a plurality of tubing sections each having a bore and an inside diameter wherein the improved method comprises using tubing sections having polyolefin liners disposed within said bore of said tubing sections to reduce frictional forces in such operations and increase the operating efficiency of such wells by reducing the surface roughness of said tubing and reducing the coefficient of friction between the said liner and materials in contact with the liner.

For a string of tubing comprising a plurality of tubing sections each having a bore and an inside diameter wherein the improved method comprises using tubing sections having polyolefin liners disposed within said bore of said tubing sections to reduce the adherence of surface deposits such as scale or paraffin that restrict the inside diameter of the pipe and constrict the flow capacity of the tubing string.

For a string of tubing comprising a plurality of tubing sections each having a bore and an inside diameter wherein the improved method compromises using tubing sections having polyolefin liners disposed within said bore of said tubing sections to reduce the inside diameter of the tubing string with the liner to increase the velocity of the transported material. This is commonly referred to as a velocity string.

Referring now to FIG. 1, there is shown metal tubing 30, coupling 36, and liner 40. Two joints of metal tubing 30, having an inner diameter 32 and outer diameter 34, are connected together by coupling 36. Disposed within each tubing joint 30 adjacent to its inner surface 38 is a liner 40 (an embodiment of which is shown in detail in FIG. 2). Liner 40 may be a multilayer system comprising both a wear resistant material and a diffusion barrier. In some embodiments, where gas diffusion is of minimal or no concern, liner 40 may comprise a layer comprising only a wear barrier such as polypropylene with no diffusion barrier being present. That is, a specific embodiment includes a liner having a single layer that includes polypropylene.

The liner 40 may be disposed within the tubing 30 by any one of several methods known in the art. One method of disposing the liner within the tubing bore is to provide a polymer liner having an outside diameter which is slightly greater than or equal to the inner diameter of the tubing section pipe having an outside diameter larger than the internal diameter of the tubing. Reduce the outside of the liner and insert the reduced diameter liner within the tubing. After the liner is in place, it will attempt to substantially return to its original shape and will become secured within the tubing section via process called plastic deformation. There may be numerous methods of reducing the outside diameter of the liner for insertion into a tubing section are available. For example, rollers may be used to mechanically reduce the outside diameter of the liner by the desired amount and to push the liner into the tubing joint. Other methods include pulling the liner through a sizing sleeve or orifice and pushing the reduced diameter liner into place in the tubing.

One method of disposing the polymer liners within the tubing sections includes providing a liner having an initial outside diameter similar to or larger than the inner diameter of the tubing, reducing the outer diameter of the liner by mechanical means and inserting the liner into the tubing bore. The ends of the polymer liner may then be softened using a heat source and formed around the end of the external pipe thread on the metal pipe. In some cases, the ends may be reinforced for additional structural integrity. The ends may then be joined onto a coupling (with or without an internal coating or corrosion resistant insert) used to join each stick of lined pipe. The process ultimately provides a one-piece seamless liner in each joint that is mechanically bonded to the metal pipe ID. The wall thickness of the claimed liners is preferably between about 2 and 10 millimeters. The diameter of the claimed liners may be between about 20 and 700 millimeters or greater. In the embodiments shown in FIG. 1, the thickness "t" of the liner 40 is about 4 millimeters.

Figure 2:
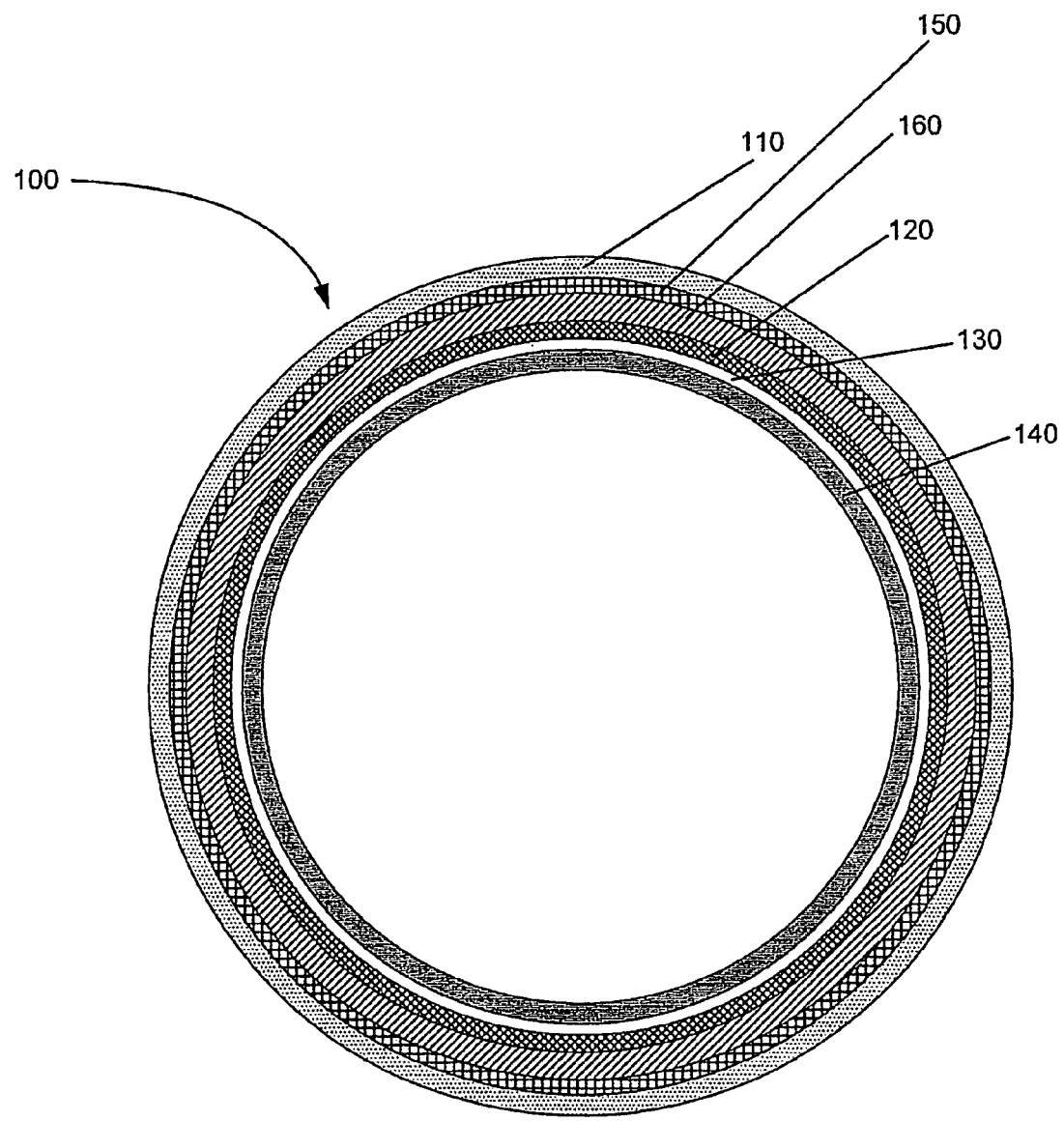
FIG. 2 is a cross section of a tubular good in accordance with embodiments of the present invention.

Referring now to FIG. 2 (not to scale), there is shown lined tubular good 100 comprising outer layer 110, diffusion barrier 120, adhesive layers 130 and 160 (optional), and friction and wear reducing layers 140 and 150 outer layer 110 may be a metal tubular good such as an OCTG, a flowline tubular good, or a solution mining or slurry transport line. The tubular good liner is preferably comprised of elements 120, 130, 140, 150, and 160. Friction and wear reducing layers 140 and 150 may comprise, by way of example only, polyethylene or polypropylene. Layers 140 and 150 may or may not consist of the same material. Diffusion reducing layer may comprise, by way of example only, a vinyl alcohol such as polyvinyl alcohol. Layer 140 may be bonded to diffusion barrier 120 by any method as would be appreciated by one of skill in the art. By way of example only, layers 120 and 140 may be bonded by adhesive layer 130 and layers 150 and 120 may be bonded by adhesive layer 160. Adhesive layers 130 and 160 may be, but are not necessarily, the same adhesive. Adhesive layers 130 and 160 may comprise, any acceptable polymer adhesive as is known in the art, such as copolymers.

In addition, layers 120 and 140 may be bonded by the addition of additives to the layers, by way of example only, 2,5-furandione, when added to the layers, may cause the layers to become bonded together without the need for additional adhesives.

The layers are typically coextruded through a specially designed extrusion die head using multiple extruders. The melted polymer layers are then cooled into one continuous seemless tube.

While embodiments of the invention have been described herein, it will be recognized and understood that various modifications may be made and the appended claims are intended to cover all such modifications which may fall within the spirit and scope of the invention.

By way of example only, the friction and wear reducing layer may comprise nucleated polypropylene; polyolefins containing nanocomposites or other additives to control diffusion rates; impact copolymer grade polypropylene; homopolymer grade polypropylene; heterophasic copolymers; fractional melt grade polypropylene; other thermoplastics coextruded with polypropylene; reactor made thermoplastic polyolefins; metallocene catalyzed polypropylenes; random copolymer polypropylenes; blends, alloys, filled or reinforced polypropylene or polyethylene containing other polyolefins and structural reinforcement. In addition, additives may be included in the polymer to increase the lubricity of the liner material and decrease the coefficient of friction of the product.

The gas diffusion barrier may comprise other polymers, organic or inorganic materials, or metals. In some embodiments, this barrier is chosen to reduce or eliminate the permeation of carbon dioxide through liners utilized in $CO_2$ floods and WAG (water-alternating-gas) injection systems for oil production enhanced recovery operations.

In embodiments in which the friction wear reducing layer and the diffusion barrier are chemically bonded 2,5-furandione or other similar additives may be used. The layers may also be bound by any acceptable adhesive as is known in the art. For example, an acceptable adhesive may comprise a copolymer. It is also envisioned that the friction wear reducing layer and the diffusion barrier need not be directly bonded together. There may be intermediate layers between the two. Additionally, there may be layers radially outward or inward of the diffusion barrier. By way of example only, the diffusion barrier may be sandwiched between the friction and wear reducing layer and a third layer. The third layer may be of the same or different material as the friction and wear reducing layer.

SPECIFIC EMBODIMENTS

Although not so limited, specific embodiments of the invention can be expressed in summary form, as set forth below:

Internal corrosion by corrosive fluids and gases in all types of production and injection wells can be controlled with the present invention, through the use of certain polyolefins such as polypropylene and methods for their application to the tubing, it being understood that each of the wells include some form of tubing.

In accordance with the present invention a plurality of different types of wells including free flowing, reciprocating rod pumped, plunger lifted, gas lifted, submersible pumped, progressive cavity pumped, hydraulically lifted, source, injection or disposal wells that have downhole tubulars may have their performance increased. In all of these wells, a tubing string is employed to convey materials either into or out of a downhole reservoir. The improved method and apparatus comprises using tubing sections having certain abrasion and corrosion resistant polyolefin liners disposed within the inside bore of the tubing to eliminate contact between the moving parts of the artificial lift systems and corrosive fluids with the inside bore of the tubing. Polyolefin liners, such as polypropylene, have a coefficient of friction that is superior to the coefficient of friction of steel tubing alone. Further, when polyolefin liners are wetted by fluid, susceptibility to abrasion is further reduced. In addition to the substantial benefits of protecting the tubing string on a rod pumped well from the detrimental effects caused by reciprocating or rotating rods, certain polyolefin liners mitigate the effects of corrosive agents such as salt water, dissolved oxygen, carbon dioxide, hydrogen sulfide, and other corrosive elements commonly present in injection and production wells. The liner also serves as a barrier that will not allow bacteria that cause microbiologically influenced corrosion to occur.

As discussed above, a preferred method of disposing the polymer liners within the tubing sections includes providing a liner having an initial outside diameter similar to or larger than the inner diameter of the tubing, reducing the outer diameter of the liner by mechanical means and inserting the liner into the tubing bore. The ends of the polymer liner are then softened using a heat source and formed around the end of the external pipe thread on the metal pipe. In some cases, the ends are reinforced for additional structural integrity. The ends are then joined onto a coupling (with or without an internal coating or corrosion resistant insert to protect the coupling depending on the type of service that the pipe will go into) used to join each stick of lined pipe. The process ultimately provides a one-piece seamless liner in each joint that is mechanically bonded to the metal pipe ID. The wall thickness of the liners is typically between about 2 and 10 millimeters. The diameter of the liners is typically between about 20 and 700 millimeters.

Also disclosed herein are methods and apparatus for reducing or eliminating the mechanical and/or chemical wear, fatigue, and failure on tubular goods. The methods comprise disposing a liner along at least a portion of the tubular good. The liner may decrease friction, thereby decreasing mechanical wear as well as reducing the amount of energy necessary to operate the mechanical tool or pump the abrasive fluid. In addition, the liner may also comprise a material which is resistant to particular chemicals or a barrier to particular chemicals, thereby decreasing or eliminating contact between the chemicals and the tubular good and decreasing or eliminating the wear or corrosion caused by those chemicals.

In one or more specific embodiments, the invention can relate to a tubular good comprising: an outer pipe layer; and an inner layer, wherein the inner layer comprises a diffusion barrier and a friction reducing layer, and wherein the diffusion barrier is disposed radially outward of the friction reducing layer.

In one or more specific embodiments, a tubular good can be provided which further comprises an adhesive layer disposed between the diffusion barrier and the friction reducing layer.

In one or more specific embodiments, a tubular good can be provided wherein the tubular good is an oil country tubular good.

In one or more specific embodiments, a tubular good can be provided wherein the tubular good is a flowline tubular good.

In one or more specific embodiments, a tubular good can be provided wherein the diffusion barrier comprises a vinyl alcohol.

In one or more specific embodiments, a tubular good can be provided wherein the friction reducing layer comprises a polyolefin.

In one or more specific embodiments, a tubular good can be provided wherein 2,5-furandione is used as an additive to bond the diffusion barrier and the friction reducing layer.

In one or more specific embodiments, a tubular good can be provided wherein the friction reducing layer comprises polyethylene.

In one or more specific embodiments, a tubular good can be provided wherein the friction reducing layer comprises a homopolymer.

In one or more specific embodiments, a tubular good can be provided wherein the friction reducing layer comprises a copolymer.

In one or more specific embodiments, a tubular good can be provided wherein the friction reducing layer comprises polypropylene.

In one or more specific embodiments, a tubular good can be provided further comprising a third layer radially outward from the diffusion barrier and radially inward from the outer pipe layer.

In one or more specific embodiments, a method of preparing a tubular good is provided, the method comprising: providing an outer tubular layer; providing an inner tubular layer; wherein the inner tubular layer comprises a chemical barrier and a wear reducing layer; wherein the chemical barrier is disposed radially outward from the wear reducing layer; inserting the inner tubular layer into the outer tubular layer.

One or more of the methods disclosed herein can further comprise bonding the chemical barrier to the wear reducing layer.

One or more of the methods disclosed herein can further comprise providing an adhesive layer disposed between the chemical barrier and the wear reducing layer, wherein the adhesive layer bonds the chemical barrier to the wear reducing layer.

In one or more of the methods, an additive comprising 2,5-furandione can be used to bond the diffusion barrier and the friction reducing layer.

In one or more of the methods, a wear reducing layer comprises a polyolefin, or a polypropylene, or a polyethylene, or a copolymer, or a homopolymer.

In one or more of the methods, a diffusion barrier comprises a vinyl alcohol.

One or more of the methods disclosed herein can further comprise providing a third layer wherein the third layer is disposed radially outward from the diffusion barrier and radially inward from the outer tubular layer.

Also disclosed herein is a tubular good liner comprising: a wear barrier and a diffusion barrier; wherein the diffusion barrier is disposed radially outside of the wear barrier; and wherein the diffusion barrier is bonded to the wear barrier.

One or more of the tubular goods disclosed herein further comprises an adhesive layer bonding the wear barrier to the diffusion barrier.

In one or more of the tubular good liners an additive comprising 2,5-furandione can be used as an additive to bond the diffusion barrier and the friction reducing layer.

In one or more of the tubular good liners, the wear barrier comprises polyethylene or polypropylene.

In one or more of the tubular good liners, the diffusion barrier comprises a vinyl alcohol.

In one or more of the tubular good liners, the wear barrier comprises a homopolymer, or it can comprise a copolymer.

One or more of the tubular liners comprises a third layer disposed radially outward from the diffusion barrier.

Also described here is a tubular good liner comprising: a means for reducing friction; a means for preventing diffusion of a compound; and a means for bonding the means for reducing to the means for preventing; wherein the means for preventing is disposed radially outward from the means for reducing.

The tubular good that includes a tubular good liner can be a flowline tubular good; or a slurry transport line; or a solution mining tubular good.

In one or more of the tubular good liners, the tubular good houses a reciprocating member. In others, the tubular good can contain a rotating member.

In one or more of the methods that uses tubular good liners, the tubular good transports abrasive material.

Also disclosed herein is a method for producing well fluids including: providing a rod pumping system comprising at least one sucker rod disposed within a string of tubing which extends into said well, the string of tubing comprising at least one tubing section having a bore and an inside diameter; a down hole pump operably connected to the at least one sucker rod; and means for reciprocating the at least one sucker rod; wherein a liner comprising polypropylene is disposed within the bore of the tubing to eliminate or reduce contact between the at least one sucker rod and the tubing string.

What is claimed is:

1. A method of completing a well for production of fluids from an underground formation, which method comprises: installing within the wellbore an artificial lift apparatus and a string of tubing, wherein:
    (a) the string of tubing includes a rigid metal tubular member having (i) a protruding end, (ii) a metallic outer surface that includes external threads on or around the protruding end and (iii) a metallic inner surface, wherein the string of tubing further includes a coupling that has internal threads that screw onto the external threads on the metallic outer surface and couple the rigid metal tubular member with another rigid metal tubular member;
    (b) the metallic inner surface of the rigid metal tubular member defines a metal tubular borehole;
    (c) a liner is disposed inside the metal tubular borehole adjacent to and against the metallic inner surface;
    (d) the liner has a liner end and comprises one or more layers;
    (e) at least one of the layers of the liner includes a polypropylene homopolymer; and
    (f) the liner end has been softened using a heat source and formed while in a softened condition around an outside surface of the protruding end of the rigid metal tubular member.

2. The method of claim 1 wherein the artificial lift apparatus includes a rod pumping system and a plurality of sucker rods disposed within a string of tubing that comprises a plurality of tubing sections each having a tubular borehole and an inside diameter; and a downhole pump operably connected to the sucker rods; wherein the one or more tubing sections has the liner comprising the polypropylene homopolymer disposed within the tubular borehole of the one or more tubing sections.

3. The method of claim 1, wherein operating an artificial lift apparatus includes operating a progressive cavity pumping system.

4. The method of claim 1, wherein the layer that includes the polypropylene homopolymer is in direct physical contact with the metallic inner surface, such that there is no other layer interposed between the metallic inner surface and the layer that includes the polypropylene homopolymer.

5. The method of claim 1, wherein the liner has an innermost layer which includes the polypropylene homopolymer such that any fluids being produced are capable of being in direct contact with the innermost layer of the liner.

6. The method of claim 1, wherein the liner has a single layer, and the single layer consists essentially of polypropylene.

7. The method of claim 1, where the liner has three or more layers and at least one of the layers includes polypropylene.

8. The method of claim 1, wherein the liner has three or more layers, including: a first outer layer, a second outer layer and an intermediate layer that is disposed between the first outer layer and the second outer layer, wherein the first outer layer or the second outer layer, or both, include polypropylene homopolymer, and wherein the intermediate layer contains no polypropylene.

9. The method of claim 1 wherein the liner includes up to 20% of an additive.

10. The method of claim 1 wherein the liner has a wall thickness between about 2 and 10 millimeters.

11. The method of claim 1 wherein the liner has a diameter between about 20 and 700 millimeters.

* * * * *